United States Patent
Frank et al.

(10) Patent No.: US 9,894,084 B2
(45) Date of Patent: Feb. 13, 2018

(54) ILLEGAL MESSAGE DESTROYER

(71) Applicants: Juergen Frank, Munich (DE); Michael Staudenmaier, Munich (DE); Manfred Thanner, Neubiberg (DE)

(72) Inventors: Juergen Frank, Munich (DE); Michael Staudenmaier, Munich (DE); Manfred Thanner, Neubiberg (DE)

(73) Assignee: NXP USA, Inc., Austin, TX (US)

(*) Notice: Subject to any disclaimer, the term of this patent is extended or adjusted under 35 U.S.C. 154(b) by 96 days.

(21) Appl. No.: 14/898,779

(22) PCT Filed: Jul. 18, 2013

(86) PCT No.: PCT/IB2013/055914
§ 371 (c)(1),
(2) Date: Dec. 16, 2015

(87) PCT Pub. No.: WO2015/008114
PCT Pub. Date: Jan. 22, 2015

(65) Prior Publication Data
US 2016/0149934 A1    May 26, 2016

(51) Int. Cl.
*H04L 29/06* (2006.01)
*H04L 12/40* (2006.01)
*G06F 21/60* (2013.01)

(52) U.S. Cl.
CPC ........ *H04L 63/1416* (2013.01); *G06F 21/606* (2013.01); *H04L 12/40032* (2013.01);
(Continued)

(58) Field of Classification Search
CPC ........... H04L 63/1416; H04L 12/40032; H04L 12/40169; H04L 63/10; H04L 63/12;
(Continued)

(56) References Cited

U.S. PATENT DOCUMENTS

| 7,373,577 B2 | 5/2008 | Uemura et al. |
| 8,627,184 B2 | 1/2014 | Hughes et al. |

(Continued)

FOREIGN PATENT DOCUMENTS

| EP | 2117200 A1 | 11/2009 |
| JP | 2009296576 | 12/2009 |

(Continued)

OTHER PUBLICATIONS

International Search Report for International Application No. PCT/IB2013/055914 dated Apr. 4, 2014.
(Continued)

*Primary Examiner* — Ghodrat Jamshidi

(57) ABSTRACT

A communication apparatus for preventing the broadcasting of unauthorized messages on a broadcast bus network, the communication apparatus comprising:
  a first memory adapted to store first information;
  a second memory adapted to store second information;
  a monitoring unit adapted to:
    monitor the bus for processing messages being broadcasted on the bus, and
    output a third information and fourth information
  a comparing unit adapted to compare the first information with the third information and the second information with the fourth information; and,
  a message destroyer adapted to:
when:
  the first information matches with the third information, and
  the second information does not match with the fourth information, causing the body of the current message to be altered while the current message is being broadcasted on the bus.

10 Claims, 2 Drawing Sheets

(52) U.S. Cl.
CPC ........ *H04L 12/40169* (2013.01); *H04L 63/10* (2013.01); *H04L 63/12* (2013.01); *H04L 63/1466* (2013.01); *H04L 2012/40215* (2013.01); *H04L 2012/40273* (2013.01)

(58) Field of Classification Search
CPC ....... H04L 63/1466; H04L 2012/40125; H04L 2012/40273; H04L 2012/40215; G06F 21/606
See application file for complete search history.

(56) References Cited

U.S. PATENT DOCUMENTS

| | | | |
|---|---|---|---|
| 2005/0138379 A1 | 6/2005 | Semple et al. | |
| 2006/0112315 A1* | 5/2006 | Pfeufer | G05B 9/02 714/47.2 |
| 2010/0215040 A1* | 8/2010 | Kappler | H04L 12/185 370/390 |
| 2015/0020152 A1* | 1/2015 | Litichever | H04L 63/14 726/1 |

FOREIGN PATENT DOCUMENTS

| | | |
|---|---|---|
| JP | 2012523166 | 9/2012 |
| KR | 20080092611 | 10/2008 |
| KR | 20100039638 | 4/2010 |
| WO | 2008084271 A2 | 7/2008 |

OTHER PUBLICATIONS

Hoppe et al, "Security Threats to Automotive CAN Networks—Practical Examples and Selected Short-Term Countermeasures", Otto-von-Guericke University of Magdeburg ITI Research Group on Multimedia Security, 2008, pp. 235-248.

* cited by examiner

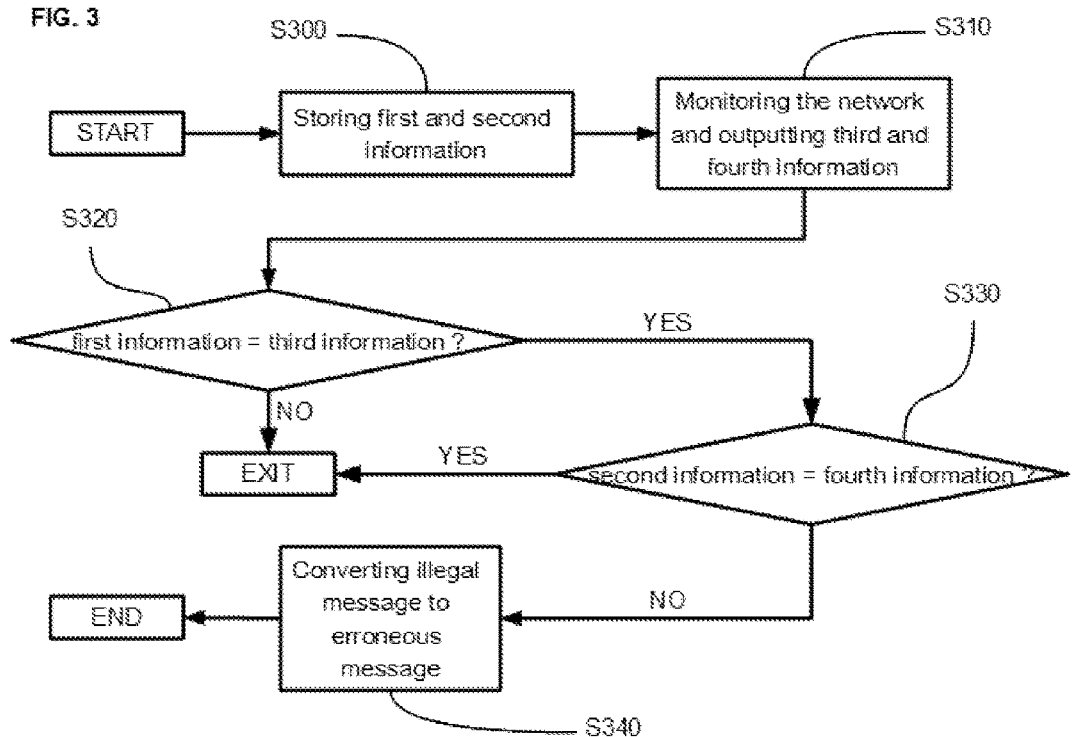

ILLEGAL MESSAGE DESTROYER

FIELD OF THE INVENTION

This invention relates to an apparatus, a system, a method and a program product of preventing the broadcasting of unauthorised messages on a broadcast bus network.

BACKGROUND OF THE INVENTION

Broadcast bus networks are based on the principle of broadcast transmission technique in which a message to be transmitted on the bus is sent to all the nodes connected to that network including the one for which the message is intended and the one from which the message was sent. In some of these networks, the nodes do not possess a physical address like an Internet Protocol (IP) address as it is the case in networks such as Ethernet for instance. Rather, the addressing system of these networks is based on message identifiers which are unique network-wide. In these networks, nodes look inside the broadcasted message to see if it was meant for them. If it is the case, the node to which the message was intended processes it. Otherwise, the message is simply discarded.

It is to be noted that some of these broadcast bus networks do not have intrinsic support for any kind of security such as assuring authenticity of the broadcasted messages, for instance. Indeed, in such networks the message identifier only designates the information contained in the message while neither the origin nor the destination node is included. This is mainly due to the fact that the usual sender of each message type is implicitly known, however a node has no possibility to verify this assumption. In this context, nodes cannot detect that an illegal message originates from a non-authentic source, for instance. Therefore, nodes can incorrectly rely on forged contents of an illegal message and consequently perform unauthorised actions.

It may be understandable that a certain level of security is not needed where these networks are operating in a secure environment. However, when operating in a less secure environment, broadcast bus networks are opened to intruders which can manipulate the broadcasted messages or inject forged messages in a way to illegally trigger sensitive or critical functions, for instance. Some documents suggest using message authentication codes (MAC) or digital signatures appended to the transmitted messages in order to address such weaknesses as indicated in: Tobias Hoppe, Stefan Kiltz, and Jana Dittmann. 2008. "Security Threats to Automotive CAN Networks—Practical Examples and Selected Short-Term Countermeasures" (p 241); In *Proceedings of the 27th international conference on Computer Safety, Reliability, and Security* (SAFECOMP '08), Michael D. Harrison and Mark-Alexander Sujan (Eds.); Springer-Verlag, Berlin, Heidelberg, 235-248; DOI=10.1007/978-3-540-87698-4_21 http://dx.doi.org/10.1007/978-3-540-87698-4_21.

However, such solution is not appropriate because of both the computational and communication overhead it involves thus leading to large authentication delays which are unacceptable in certain critical applications. Additionally, this solution would require the implementation of cryptographic measures in all the nodes of the broadcast bus network, thus leading to an increase of the cost of the nodes.

SUMMARY OF THE INVENTION

The present invention provides an apparatus, a system, a method and a program product of preventing the broadcasting of unauthorised messages on a broadcast bus network as described in the accompanying claims. Specific embodiments of the invention are set forth in the dependent claims.

These and other aspects of the invention will be apparent from an elucidated with reference to the embodiments described hereinafter.

BRIEF DESCRIPTION OF THE DRAWINGS

Further details, aspects and embodiments of the proposed solution will be described, by way of example only, with reference to the drawings. In the drawings, like reference numbers are used to identify like or functionally similar elements. Elements in the figures are illustrated for simplicity and clarity and have not necessarily been drawn to scale.

FIG. 3 is a schematic flow diagram of a method according to an embodiment of the subject application.

DETAILED DESCRIPTION OF THE PREFERRED EMBODIMENTS

Because the illustrated embodiments of the proposed solution may for the most part, be composed of electronic components and circuits known to those skilled in the art, details will not be explained in any greater extent than that considered necessary for the understanding and appreciation of the underlying concepts of the subject application, in order not to obfuscate or distract from the teachings of the subject application.

However, for the sake of simplicity, the following detailed description will be based on implementation of the proposed solution in a conventional broadcast bus network such as the Controller Area Network (CAN) system in accordance with ISO 11898. However, persons skilled in the art of network communications will understand that the proposed solution may also be implemented in other broadcast bus networks, having similar characteristics.

Also, for the sake of clarity and for a proper understanding of the subject application, the CAN bus will be considered in the automotive domain wherein it is commonly used to provide deterministic communications between nodes which are called electronic control units (ECUs). Indeed, attackers in the automotive domain usually have full physical access to breach the security of the CAN system such that they can manipulate or replace almost every ECUs and can alter its actual physical environment and inputs. Hence, such attackers can perform almost any feasible attack without having to fear to be detected, backtracked, or locked out. However, persons skilled in the art of network communications will understand that the proposed solution may also be implemented in other domains such as in home and industrial automation or medical equipment, for instance.

It is reminded that within a CAN system, when an unauthorised message is injected on the bus by a device different from the original sending ECU, the receiving ECUs have no proof that the message has been really sent by the original sending ECU. Therefore, CAN systems do not possess any appropriate authenticity measures. However, an injected message will also arrive at the original sending ECU since all the ECUs are connected to the bidirectional broadcast bus. Based on this basic principle it may be possible to at least detect suspicious messages broadcasted on the bus.

Figure 1:
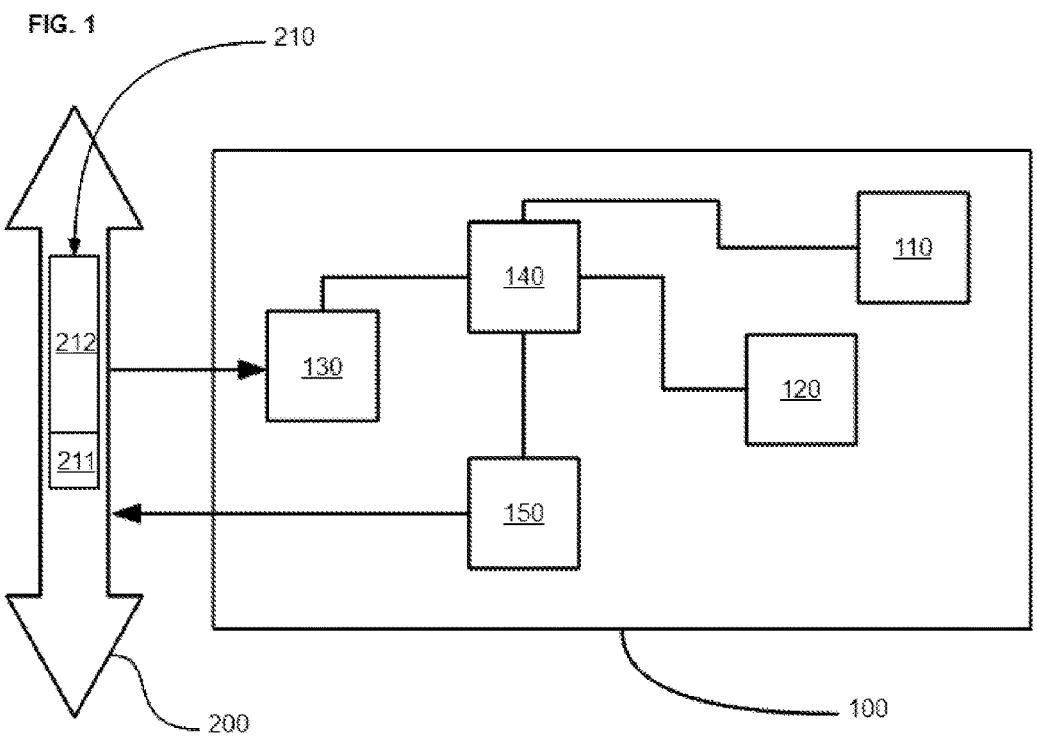
FIG. 1 is a schematic diagram of an apparatus according to an embodiment of the subject application.

Referring to FIG. 1, there is diagrammatically shown therein an exemplary communication apparatus 100 and a broadcast bus network 200 such as a CAN system as described above.

In the example of FIG. 1, the communication apparatus 100 is adapted to receive and/or broadcast authorised messages 210 on the broadcast bus network 200 which corresponds to the basic features of an ECU. Additionally, the communication apparatus 100 is further adapted to prevent the broadcasting of unauthorised messages 210 on the bus 200. In FIG. 1, authorised and unauthorised messages 210 comprise a header 211 and a body 212 wherein the header 211 is broadcasted before the body 212. Also, the header 211 comprises an indication of the type of message 210 being broadcasted. Referring back to FIG. 1, the communication apparatus 100 as shown comprises:

- a first and a second memory 110, 120 such as read only memory (ROM) or random access memory (RAM);
- a network monitoring unit 130;
- a comparing unit 140; and,
- a message destroyer 150.

In examples of embodiments, at least the network monitoring unit 130, the comparing unit 140 and the message destroyer 150 may be implemented as hardware, software or any combination thereof, for instance.

In other examples of embodiments, the first and a second memory 110, 120 may be implemented as a single memory unit, for instance.

Referring back to FIG. 1, the first memory 110 is adapted to store first information with respect to at least one type of authorised messages 210 which can be broadcasted by the communication apparatus 100. For example, the first information may be an exclusive list or similar structure, of message identifiers which may indicate associated messages 210 and which may only be broadcasted by the communication apparatus 100. Therefore, with the first information, the communication apparatus 100, while acting as a sending node, may detect whether a message 210 being transmitted on the bus 200 comprises one of the exclusive identifier associated with it. For example, that detection could be done by looking inside the header 211 of the current message 210 being sent on the bus 200 and then comparing that information with the first information. This feature contrasts with original features of broadcast bus networks such as CAN systems, for instance. Indeed, in such networks an information similar to the first information exists, however it is solely used to filter incoming messages 210 in order to decide whether to process them or not. In contrast, in the proposed solution, the first information is used to verify whether the current broadcasted message 210 corresponds to an exclusive message 210 (e.g., a message 210 having an identifier comprised in the exclusive list) which may be broadcast by a sending node.

Referring back to FIG. 1, the second memory 120 is adapted to store second information with respect to at least the last authorised message 210 broadcasted by the communication apparatus 100. For instance, the last authorised message 210 broadcasted on the bus 200 may comprise a message identifier pertaining to the first information as described above. For example as well, every time a message 210 is broadcasted by the communication apparatus 100, the second information may be stored on the second memory 120. Consequently, with the knowledge of the first and second information, it may be possible for the communication apparatus 100, while acting as a sending node, to determine whether an exclusive message 210 being transmitted on the bus 200 has been sent by itself. Therefore with these features, an illegal or suspicious message 210 may be easily detected on the bus 200. However, others approaches based on at least the first and second information may be contemplated, for instance.

In the example of FIG. 1, the monitoring unit 130 is operably coupled to the bus 200 and is adapted to monitor the bus 200 for processing messages 210 being broadcasted therein. It is noted that this feature of the monitoring unit 130 is an inherent characteristic of broadcast bus networks wherein all the nodes connected to the bus 200 receive and process any broadcasted message 210. However, the monitoring unit 130 of the proposed solution is further adapted to output a third information with respect to a type of the current message 210 being broadcasted on the bus 200 and a fourth information with respect to at least part of the header 211 of the current message 210. It is noted that third and fourth information correspond to characteristics of the current message 210 being broadcasted on the bus 200. For instance, third information may have a similar structure as the first information. In a example, third information may be a list comprising one message identifier (i.e., the message identifier of the current message 210). Fourth information may comprise at least part of the header 211 of the message 210 currently being broadcasted on the bus 200. In one embodiment, third and fourth informations may be implemented as single information. In fact, as the header 211 comprises the type of the current message 210 being broadcasted, then having information about the header 211 might suffice to encompass the features of the third and fourth information.

Referring back to FIG. 1, third and fourth information are passed to the comparing unit 140 which is operably coupled to the monitoring unit 130, the first memory 110 and the second memory 120. Notably, the comparing unit 140 is adapted to compare:

- the first information with the third information; and,
- the second information with the fourth information.

Comparing the first information with the third information would provide an indication of whether the current message 210 being broadcasted is an exclusive message 210 of the communication apparatus 100. This would be case if the first information matches with the third information (i.e., if third information is comprised in list of first information). If it the case, it should be assessed whether that exclusive message 210 was sent by the communication apparatus 100. This assessment is made by comparing the second information with the fourth information. In fact, if the second information does not match with the fourth information, it could be deduced that the current message 210 being broadcasted on the bus 200 was not sent by the communication apparatus. Indeed, in broadcast bus networks such as CAN system, only one sending node may broadcast a message 210 at a time. Hence, if a sending node is having exclusivity in sending certain types of messages 210 on the bus 200, and if that sending node sends a message 210 then the second information should match with the fourth information. Otherwise, it would mean that an illegal message 210 is being transmitted on the bus 200.

In the example of FIG. 1 and according to the proposed solution, where the first information matches with the third information, and the second information does not match with the fourth information, the message destroyer 150 is operably coupled to the comparing unit 140. Further, the message destroyer 150 is adapted to convert the current message 210 being transmitted on the bus 200 into an erroneous message 210. This feature is based on the error detection and correction mechanisms which are built-in in broadcast bus networks such as CAN system. In fact, in CAN system for instance, any five corrupted single bits per message 210 may be detected thanks to a fifteen bit Cyclic Redundancy Check (CRC) with a Hamming distance of six. Other error handling techniques are also available such as read-after-write error detection or parity bit check which basically disregards erroneous messages 210 once they have been detected. One of the idea behind the above-mentioned feature is that when an illegal message 210 is detected on the bus 200, that illegal message 210 should be disregarded by the receiving nodes before any sensitive and/or unauthorised command is triggered such as a brake command in a vehicle, for instance. In order to achieve this objective, it is proposed to cause the body 212 of the current message 210 to be altered while the current message 210 is being broadcasted. In fact, since any message 210 sent on the bus 200 is sent bit by bit, once an illegal message 210 has been detected based at least on information contained in its header, it is still possible to modify the remain part of the illegal message 210 that is yet to be transmitted (i.e., the body 212 of the illegal message 210). Hence, if the modification of the body 212 is such that the illegal message 210 is seen by the receiving nodes as an erroneous message 210, then the illegal message 210 would be discarded and consequently, the sensitive and/or unauthorised command would not be triggered.

In order to alter the body 212 of the illegal message 210 one may use characteristics of a bus access mechanism such as the one used in CAN system which is implemented as a non-destructive with bitwise arbitration. Non-destructive means that a sending node is forced to back off from transmitting a message 210 if a higher priority message 210 is being sent by another sending node. In other words, it means that the winner of the arbitration (i.e., the message 210 with the higher priority) must not restart from the beginning while the loser of the arbitration may do so. The arbitration may be performed by bitwise comparison of the message identifiers. Hence, if a first sending node is scheduled to send a message 210 on the bus 200, but is interrupted by an incoming message 210 originating from a second sending node, it first examines the identifier of the incoming message 210. Namely, a bitwise comparison may be performed by comparing the identifier of the incoming message 210 and the identifier of scheduled message 210. Then, if the identifier of the scheduled message 210 has a lower value than the one of the incoming message 210, the first sending node would have priority and would continue sending the scheduled message 210. Otherwise, if the identifier of the scheduled message 210 has a higher value than the one of the incoming message 210, the second sending node would have priority and would start sending the incoming message 210 while the first sending node would stops its transmission until the bus is free. This simple yet effective approach is similar to the way real time operating systems provide pre-emption for running tasks when a higher priority task is scheduled to run. To conclude, this strict priority-based scheduling allows deterministic scheduling to occur and allows the possibility to alter the body 212 of the current illegal message 210. For example, once an illegal message 210 is detected, series of high-priority bits (also known as dominant level bits) may be immediately sent on the bus 200 to overwrite the body 212 of the illegal message 210. For instance, the series of dominant bits may be sent in continuous way or in a staggered way.

In one of the embodiments, the message destroyer 150 may further be adapted to alter at least part of the body 212 of the current message 210. For example, by altering the CRC sequence contained in the body 212 of the illegal message 210, the received CRC sequence would be different from the calculated CRC sequence and thus a CRC error associated with the currently broadcasted message 210 would be detected on the bus 200. Same alteration could be made on other fields of the body 212 of the illegal message 210 in order for the convert it into an erroneous message 210.

Figure 2:
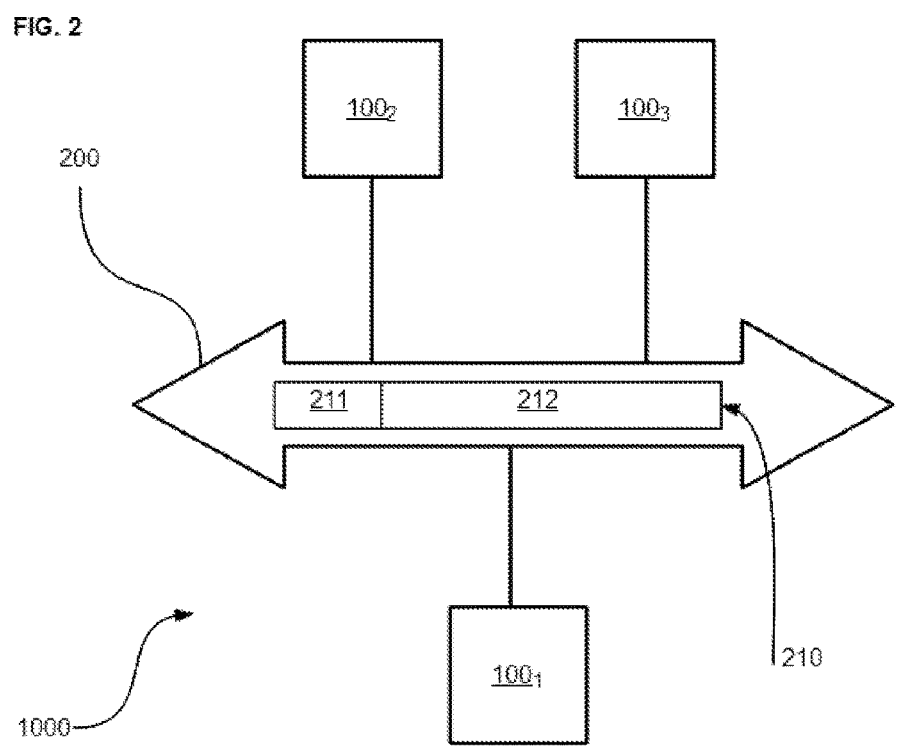
FIG. 2 is a schematic block diagram of a system in accordance with the subject application.

Referring now to FIG. 2, there is diagrammatically shown therein an exemplary communication system 1000. The communication system 1000 as shown comprises:
- the broadcast bus network 200;
- a first communication apparatus 100$_1$ according to FIG. 1 and adapted to receive and broadcast authorised messages 210 on the bus 200; and,
- at least one second communication apparatus 100$_2$, 100$_3$ according to FIG. 1 and adapted to receive authorised messages 210 from the bus 200.

In the example of FIG. 2 as shown, the message destroyer 150 of the first communication apparatus 100$_1$ is activated and the message destroyer 150 of each of the second communication apparatus 100$_2$, 100$_3$ is deactivated. This configuration correspond to the case where only one ECU is responsible for monitoring and getting rid of illegal messages 210 in accordance with the proposed solution. This configuration is cost effective since only one ECU need to embody the teachings of the proposed solution. However, persons skilled in the art of network communications will understand that others configuration may be contemplated depending on the context. For example, more than one ECU may be used to destroy illegal provided that each such ECU has an exclusive list of message identifiers different from the one of the others.

In FIG. 2, the first and second communication apparatuses 100$_1$, 100$_2$, 100$_3$ are further adapted to receive erroneous message 210 broadcasted on the bus 200. For example, in one embodiment, the first and second communication apparatuses 100$_1$, 100$_2$, 100$_3$ may be further adapted to discard the processing of a received erroneous message 210.

In another example once an erroneous has been detected and/or has been discarded, at least the second communication apparatus may be further adapted to enter into a safety state in response to the reception of an erroneous message 210. This way, for instance, additional measures on the ECU may be activated such as the double checking of the received commands, the displaying of an information message 210 to the driver or owner (e.g., by SMS is font physically present) of vehicle.

Referring now to FIG. 3, there is diagrammatically shown therein a flow diagram of a method according to an embodiment of the subject application and with regard to the communication apparatus 100 of FIG. 1.

In FIG. 3, in S300, it is stored in the first memory 110 of the communication apparatus 100 a first information with respect to at least one type of authorised messages 210 which can be broadcasted by the communication apparatus 100. Also, it is stored in the second memory 120 of the communication apparatus 100 a second information with respect to at least the last authorised message 210 broadcasted by the communication apparatus 100.

In S310, it is monitored the broadcast bus network 200, and based on the monitoring it is outputted a third information with respect to a type of a current message 210 being broadcasted on the bus 200 and a fourth information with respect to at least part of the header 211 of the current message 210.

In S320, it is compared the first information with the third information and in S330, it is compared the second information with the fourth information.

In S340, when the first information matches with the third information, and the second information does not match with the fourth information, it is converted the current message 210 into an erroneous message 210 by causing the body 212 of the current message 210 to be altered while the current message 210 is being broadcasted on the bus 200.

Possibly, in one embodiment, it may be altered at least part of the body 212 of the current message 210.

The skilled person would appreciate that the proposed solution may be embodied in an electronic system that prevents the broadcasting of unauthorised messages 210 on a broadcast bus network. The electronic system may be integrated in a single communication apparatus such as an ECU. For example, the monitoring unit 130, the comparing unit 140 and the message destroyer 150 may be embodied in a single electronic unit. Additionally, one should appreciate that the subject application takes advantage of the inherent propriety of broadcast bus networks which has a bus access mechanism which is non-destructive with bitwise arbitration as described above. The proposed solution may thus provide less communication overhead for apparatus embodying the teachings of the subject application compared to other solution such those based on cryptographic measures (e.g., message authentication systems).

Of course, the above advantages are exemplary, and these or other advantages may be achieved by the proposed solution. Further, the skilled person will appreciate that not all advantages stated above are necessarily achieved by embodiments described herein.

The proposed solution may also be implemented in a computer program product stored in a non-transitory computer-readable storage medium that stores computer-executable code which causes a processor computer to perform the operation of the message destroyer 150, for instance. For example as well, the feature directed to the monitoring unit 130 and the comparing unit 140 may be embodied in a program product.

A computer program product is a list of instructions such as a particular application program and/or an operating system. The computer program may for example include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory unit storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as an operation to users and programs of the system.

The computer system may for example include at least one processing unit, associated memory unit and a number of input/output (I/O) devices. When executing the computer program, the computer system processes information according to the computer program and produces resultant output information via I/O devices.

In the foregoing specification, the proposed solution has been described with reference to specific examples of embodiments of the proposed solution. It will, however, be evident that various modifications and changes may be made therein without departing from the broader scope of the proposed solution as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality. For example, the user alert device and the driver alert may be combined in a single module. Also, one or more sensors may be combined in a single module.

Any arrangement of devices to achieve the same functionality is effectively "associated" such that the desired functionality is achieved. Hence, any two devices herein combined to achieve a particular functionality may be seen as "associated with" each other such that the desired functionality is achieved, irrespective of architectures or intermediate devices. Likewise, any two devices so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple examples of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the proposed solution is not limited to physical devices or units implemented in nonprogrammable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or operations then those listed in a claim. Furthermore, the terms "a" or "an," as used herein, are defined as one or as more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A communication system comprising: a first communication apparatus for receiving and/or broadcasting authorised messages on a broadcast bus network and for preventing the broadcasting of unauthorised messages on the broadcast bus the authorised and unauthorised messages comprising a header and a body wherein the header is broadcasted before the body and comprises an indication of the type of message being broadcasted, the communication apparatus comprising:
a first memory adapted to store first information with respect to at least one type of authorised messages which can be broadcasted by the communication apparatus;
a second memory adapted to store second information with respect to at least the last authorised message broadcasted by the communication apparatus;
a monitoring circuit coupled to the broadcast bus and adapted to:
monitor the broadcast bus for processing messages being broadcasted on the broadcast bus, and
output a third information with respect to a type of a current message being broadcasted on the broadcast bus and fourth information with respect to at least part of the header of the current message;
a comparing circuit coupled to the monitoring circuit, the first memory and the second memory, the comparing circuit being adapted to compare the first information with the third information and the second information with the fourth information; and,
a message destroyer circuit coupled to the comparing circuit and adapted to:
when:
the first information matches with the third information, and
the second information does not match with the fourth information, convert the current message into an erroneous message by causing the body of the current message to be altered while the current message is being broadcasted on the broadcast bus.

2. The communication system of claim 1, wherein the message destroyer circuit is further adapted to alter at least part of the body of the current message.

3. The communication system of claim 1, wherein the broadcast bus complies with a broadcast bus network standard such as Controller Area Network, CAN.

4. The communication system of claim 1, further comprising:
at least one second communication apparatus similar to the first communication apparatus and adapted to receive authorised messages from the broadcast bus;
wherein:
the message destroyer circuit of the first communication apparatus is activated and
a message destroyer circuit of the second communication apparatus is deactivated; and,
the first and second communication apparatuses are further adapted to receive erroneous message broadcasted on the broadcast bus.

5. The communication system of claim 4, wherein the first and second communication apparatuses are further adapted to discard the processing of an erroneous message.

6. The communication system of claim 4, wherein at least the second communication apparatus is further adapted to enter into a safety state in response to the reception of an erroneous message.

7. A method of preventing the broadcasting of unauthorised messages on a broadcast bus network comprising at least one communication apparatus configured to receive and/or broadcast authorised messages on the broadcast bus, the authorised and unauthorised messages comprising a header and a body wherein the header is broadcasted before the body and comprises an indication of the type of message being broadcasted, the method comprising:
storing in a first memory of the communication apparatus a first information with respect to at least one type of authorised messages which can be broadcasted by the communication apparatus;
storing in a second memory of the communication apparatus a second information with respect to at least the last authorised message broadcasted by the communication apparatus;
monitoring the broadcast bus, and based on the monitoring, outputting a third information with respect to a type of a current message being broadcasted on the broadcast bus and a fourth information with respect to at least part of the header of the current message;
comparing the first information with the third information and the second information with the fourth information; and,
when:
the first information matches with the third information, and
the second information does not match with the fourth information converting the current message into an erroneous message by causing the body of the current message to be altered while the current message is being broadcasted on the broadcast bus.

8. The method of claim 7, wherein in the step of converting, a message destroyer circuit is used to alter at least part of the body of the current message.

9. The method of claim 7, wherein the broadcast bus complies with a broadcast bus network standard such as Controller Area Network, CAN.

10. A non-transitory computer program product stored in a non-transitory computer-readable storage medium for preventing broadcasting of unauthorized message on a broadcast bus network to perform the steps of:

storing in a first memory of a communication apparatus a first information with respect to at least one type of authorised messages which can be broadcasted by the communication apparatus;

storing in a second memory of the communication apparatus a second information with respect to at least the last authorised message broadcasted by the communication apparatus;

monitoring the broadcast bus, and based on the monitoring, outputting a third information with respect to a type of a current message being broadcasted on the broadcast bus and a fourth information with respect to at least part of a header of the current message;

comparing the first information with the third information and the second information with the fourth information; and, when:

the first information matches with the third information, and the second information does not match with the fourth information converting the current message into an erroneous message by causing body of the current message to be altered while the current message is being broadcasted on the broadcast bus.

* * * * *